United States Patent
Tufvesson

(10) Patent No.: US 7,894,642 B2
(45) Date of Patent: Feb. 22, 2011

(54) DEVICE AND METHOD FOR FINGERPRINTS SUPERVISION

(75) Inventor: Per Tufvesson, Staffanstorp (SE)

(73) Assignee: Precise Biometrics AB, Lund (SE)

( * ) Notice: Subject to any disclaimer, the term of this patent is extended or adjusted under 35 U.S.C. 154(b) by 901 days.

(21) Appl. No.: 10/333,011

(22) PCT Filed: Jun. 21, 2001

(86) PCT No.: PCT/SE01/01432

§ 371 (c)(1),
(2), (4) Date: Feb. 21, 2003

(87) PCT Pub. No.: WO02/07070

PCT Pub. Date: Jan. 24, 2002

(65) Prior Publication Data

US 2004/0028261 A1     Feb. 12, 2004

(30) Foreign Application Priority Data

Jul. 17, 2000   (SE) ................. 0002675

(51) Int. Cl.
G06K 9/00 (2006.01)
G06K 9/46 (2006.01)
G06K 9/62 (2006.01)
G06T 1/00 (2006.01)

(52) U.S. Cl. ............ 382/124; 382/190; 382/209; 340/5.53; 340/5.83

(58) Field of Classification Search ......... 382/124, 382/190, 209; 340/5.53, 5.83
See application file for complete search history.

(56) References Cited

U.S. PATENT DOCUMENTS

| 4,246,568 | A | * | 1/1981 | Peterson ............. 382/126 |
| 5,613,014 | A | * | 3/1997 | Eshera et al. ........ 382/124 |
| 6,134,340 | A | * | 10/2000 | Hsu et al. .......... 382/124 |
| 6,289,114 | B1 | * | 9/2001 | Mainguet .......... 382/124 |
| 6,778,685 | B1 | * | 8/2004 | Jiang et al. ......... 382/124 |
| 6,917,694 | B1 | * | 7/2005 | Machida et al. ...... 382/124 |

FOREIGN PATENT DOCUMENTS

| EP | 0 813 164 | 12/1997 |
| EP | 0 918 300 | 5/1999 |
| WO | WO 00/49944 | 8/2000 |

OTHER PUBLICATIONS

"Oxford Aims for Embedded Fingerprint Verification With New Image-DSP Chip", Jul. 21, 1999, Redesign retrieved on Mar. 19, 2001.

* cited by examiner

*Primary Examiner*—Kathleen S Yuan
(74) *Attorney, Agent, or Firm*—Buchanan Ingersoll & Rooney PC

(57) ABSTRACT

A method and a device for checking fingerprints are described. The method comprises the steps of recording in succession at least two digital images of finger areas and comparing each of the recording images with a reference image that represents at least one previously recorded reference fingerprint from a reference finger areas. The device according to the invention is arranged to carry out the method.

18 Claims, 2 Drawing Sheets

DEVICE AND METHOD FOR FINGERPRINTS SUPERVISION

TECHNICAL FIELD

The present invention relates to a device that is intended to be used in a system for checking finger-prints, which device comprises a sensor which is arranged to record a fingerprint from the first joint of a finger. The invention further relates to a method for checking fingerprints.

TECHNICAL BACKGROUND

It has been known from time immemorial that fingerprints can be used to identify people. Initially fingerprints were taken manually by inking the first joint of a finger and pressing this onto a sheet of paper. A pattern of lines was thus printed onto the sheet of paper, where the lines corresponded to the ridges and the spaces between the lines corresponded to the grooves in the skin of the finger. Now fingerprints are taken using sensors that detect the pattern on the skin on the part of the finger that is held against the sensor.

Traditionally, fingerprint technology has been used primarily for the identification of criminals, but in recent years it has also begun to be used for access control.

Known access control systems are based on a person who is to be given access to something, recording his fingerprint under secure conditions. The recorded fingerprint is stored in a memory, for example a database or on a personal data carrier.

When the access control is to be carried out, the person places his finger on a sensor which records a current fingerprint. This recorded current fingerprint is compared with the previously recorded fingerprint or fingerprints that are in the memory, in order to check whether the recorded current fingerprint is the same as this previously recorded fingerprint or any one of these previously recorded fingerprints and accordingly belongs to an approved person. If so, the system sends a signal indicating that such is the case. The signal can control the access to, for example, premises, a computer or information, as applicable.

Checking whether a current recorded fingerprint is the same as a previously recorded fingerprint is carried out using hardware or software and on the basis of digital representations of the fingerprints. The fingerprint must be represented at high resolution, as only small details distinguish different fingerprints from each other. This means that there is a large amount of information that must be stored for each fingerprint, and also that there is a lot of information that has to be compared in order to determine whether two fingerprints originate from the same person.

One way of reducing the amount of information that is stored and compared is to utilise "feature extraction". According to this, the fingerprint is recorded from the person who is to be granted access to whatever is protected by the system, special features in the fingerprint are sought, such as points where the ridges divide and points where the ridges end, and the positions of these features are determined. Only the position information and the categorisation of the features is stored in the system's memory. When a person's authorisation is to be checked, this person's fingerprint is recorded again and then a check is made whether the same features recur in the same places in the current recorded fingerprint as in the previously stored fingerprint.

The sensors that are used in fingerprint systems are based on various detection techniques. There are optical sensors, which essentially comprise a transparent surface, against which the user holds his finger, a lens system and the sensor proper which has a light-sensitive surface. The lens system projects a reduced image of the fingerprint onto the sensor. Optical sensors have the disadvantage of being unwieldy in design, on account of the lens system.

There are also so-called silicon sensors, where the user's finger is in direct contact with the active surface of the sensor. At present the most common silicon sensors are capacitive. They have a sensor surface of at least 100 mm². The capacitive silicon sensors are relatively expensive as they require a large silicon area.

In addition, Atmel provides a thermal sensor with the name FingerChip™. This sensor measures 1.5 mm×14 mm. When a fingerprint is to be read, the user passes his finger over the sensor which records, at a high frequency and using thermal detection, "images" of the part of the finger that is over the sensor at that moment. The "images" are thereafter put together into a single "image" of the whole fingerprint. The whole image is thereafter compared in the normal way with a previously recorded image. This sensor requires a smaller silicon area than the sensors that record a whole fingerprint from a finger that is held still, but on the other hand is more difficult to use, as the user must pass his finger over the sensor at a relatively even speed in order for the image to be clear. If the user passes his finger over the sensor slowly or even stops, the result will be impaired as the sensor is based on temperature differences that are evened out immediately if the finger is held still.

PCT application SE00/00268 describes a device which enables a small sensor to be used. Instead of putting together several partial images to form one large image, the small image that is obtained from the small sensor is compared with various parts of a large image. By using the complete image of the fingerprint instead of only features in the image, good reliability is obtained without the sensor needing to be large.

In certain cases, however, it can be desirable not to need to store a whole fingerprint, due to the large amount of memory that is required.

There is thus a need for an alternative device for checking fingerprints, which device is relatively simple and cheap.

SUMMARY OF THE INVENTION

An object of the present invention is to provide a device that is intended to be used in a system for checking fingerprints, which device is economical to manufacture.

A further object of the present invention is to provide a method that makes possible a simpler and cheaper device for checking fingerprints.

These objects are achieved by means of a device and a method according to the independent claims.

Further characteristics of the invention are apparent from the appended claims.

The inventors have discovered that it is possible to achieve good security while at the same time using a small sensor and a small memory by comparing in succession small recorded images with a reference fingerprint.

A method for checking fingerprints according to the invention is characterised in that at least two digital images of finger areas are recorded in succession. Each of the recorded images is compared with a reference image that represents at least one previously recorded reference fingerprint from a reference finger area that is considerably larger than each of the finger areas.

By storing the reference fingerprint in the form of a reference image that represents a reference fingerprint, only a small amount of memory is needed for the storage of the reference fingerprint if the recorded image is converted into an image without grey scale, that is an image which is binary. By comparing in succession recorded images with the reference image, only the latest recorded image needs to be stored in a temporary memory. This means that it is possible to implement the comparison in hardware that can be manufactured relatively cheaply, while at the same time the security of the checking is relatively good, as several recorded images are compared with the reference image.

The comparison between the recorded images and the reference image can advantageously be carried out between comparison images, which are generated based on the recorded digital images, and the reference image, each comparison image representing at least a part of a recorded image.

As the comparison images consist of at least a part of the recorded images, they take up less memory than the recorded images.

According to one embodiment, the comparison images consist of the recorded images.

It is preferable that at least one base area is provided, the comparison image being compared with comparison areas in the reference image in the vicinity of said at least one base area. Thus, the first generated comparison image is compared with the reference image in order to find at least one base area that has at least a predetermined conformity with the comparison area. The next generated comparison image is thereafter compared with comparison areas in the vicinity of the base area in order to investigate whether the comparison image matches part of the reference image. If no comparison area is found in the vicinity of a base area that has sufficiently good conformity with the comparison image, this base area is rejected without any new base area being selected. There is thus a chain of comparisons, based on each of the original base areas. After a small number of steps, only one base area remains. The chain of base areas that preceded the remaining base area in the reference image corresponds to the path along which the finger has been moved during the recording of the images.

A preferred method according to the invention comprises the steps of (i) providing at least one base area in the reference image, (ii) recording an image of a finger area, (iii) converting the recorded image into a comparison image which represents a part of the recorded image. The preferred method according to the invention also comprises the steps of (iv) comparing the comparison image with at least one comparison area in the reference image in the vicinity of each of said at least one base area and (v) selecting one of said comparison areas as base area if the comparison image and the comparison area have at least a predetermined degree of conformity. The steps (ii) to (v) are repeated until an end condition has been fulfilled.

The end condition is preferably that images are recorded until a combined conformity is achieved between each of the base areas and the corresponding comparison image. According to one method with this end condition, each comparison obtains a comparison value. When the total comparison value for a plurality of comparisons exceeds a predetermined comparison value, then the recorded fingerprint is considered to conform with the reference fingerprint.

The end condition can alternatively be that a predetermined number of comparison images have been compared with the reference image.

A device for checking fingerprints according to the invention comprises a sensor which is arranged to record digital images of finger areas from the first joint of a finger. The device is characterised in that it also comprises a comparing means which is arranged to generate in succession comparison images from recorded images, which comparison images represent features in each of the recorded images. The device is further arranged to compare in succession each of the comparison images with a reference image which represents features in at least one previously recorded reference fingerprint which represents a reference finger area which is considerably larger than each of the finger areas.

A device according to the invention makes possible a small memory, as the recorded images are relatively small. Unlike previously known methods for checking fingerprints, the whole of the recorded fingerprint does not need to be stored at once in the device, as the recorded images are not put together but are compared in succession and as each recorded image is small.

The comparing means is advantageously implemented in hardware as this is the most rapid solution. As only a small amount of memory is required in a device according to the invention, a fast memory can be implemented in hardware at a low cost.

Since more than one recorded image is compared with the reference image, the reference image can be a simplified image of the reference fingerprint. This enables the memory requirement for the reference image to be small.

The device according to the invention is preferably arranged to select in succession base areas in the reference image by comparing the latest generated comparison image with the reference image, the comparison images being compared with comparison areas in the reference image in the vicinity of said at least one base area. By selecting base areas in succession, a chain is obtained of base areas that have been compared with comparison images. The comparison between the comparison images and the comparison areas can be carried out in a plurality of known ways.

It is preferable for the comparison image to be generated based on only a part of the recorded image, which part is the part of the recorded image that contains the most features.

By using only a part of the recorded image, the comparison can be carried out more quickly, while at the same time sufficiently good accuracy can be achieved by selecting the optimal part of the recorded image, in which part there is the maximum number of features.

The device is advantageously arranged to record images until a combined conformity is obtained between each of the base areas and the corresponding comparison image. According to one embodiment, with this end condition, each comparison results in a comparison value. When the total comparison value for a plurality of comparisons exceeds a predetermined point total, then the recorded fingerprint is considered to conform with the reference fingerprint.

Alternatively, the device is arranged to record images until a predetermined number of images have been recorded and compared.

The device has advantageously a sensor that has a length in the range 5-25 mm, preferably 10-20 mm, and a width in the range 0.1-5 mm, preferably 0.3-3 mm.

The sensor can be of any type. For example, it can be optical or capacitive.

Of course, the different characteristics of the invention that relate to the method can also be implemented in the device according to the invention, and vice versa.

BRIEF DESCRIPTION OF THE DRAWINGS

The present invention will now be described with reference to the attached drawings, in which.

DESCRIPTION OF PREFERRED EMBODIMENTS

Figure 1:
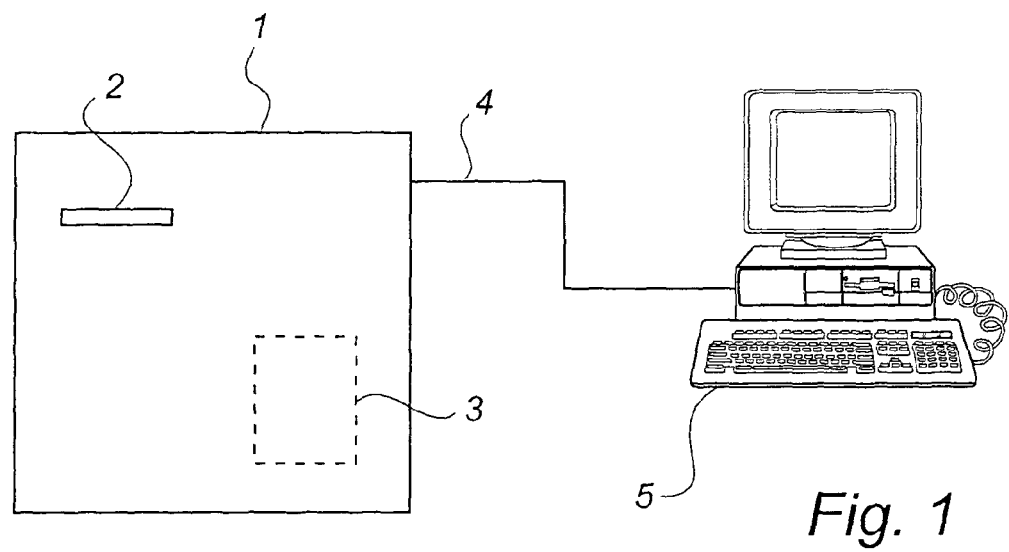
FIG. 1 shows a device according to the invention for checking fingerprints.

FIG. 1 shows a device 1 according to the invention for checking fingerprints. The device comprises a long and narrow silicon sensor, which is 1 mm high and 10 mm wide, and a comparison device 3 for comparing an image recorded by the silicon sensor with a reference image which was stored in the device previously. The device has an output 4 via which an output signal can be sent indicating whether the fingerprint conforms with the reference fingerprint. The device is designed as a free-standing unit which is connected to a computer 5 which is made available to the user if the reference image conforms with the fingerprint that is recorded by the silicon sensor.

Figure 2:
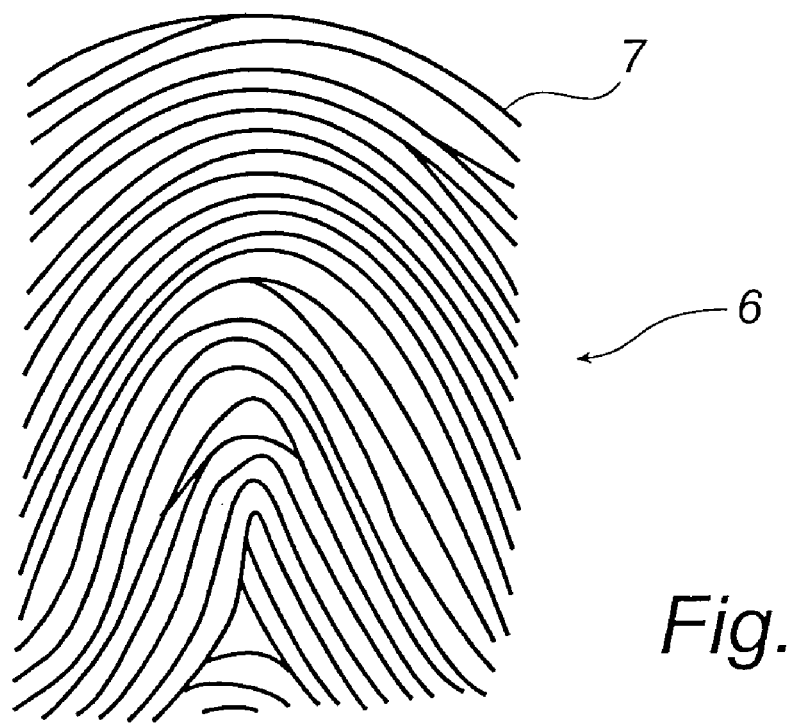
FIG. 2 shows a reference image which is used for checking fingerprints according to the invention.

FIG. 2 shows a reference image 6 of a fingerprint. The black lines 7 correspond to grooves in the fingerprint. The reference image has been recorded by the same sensor 2 as is used for checking the fingerprints.

Figure 3:
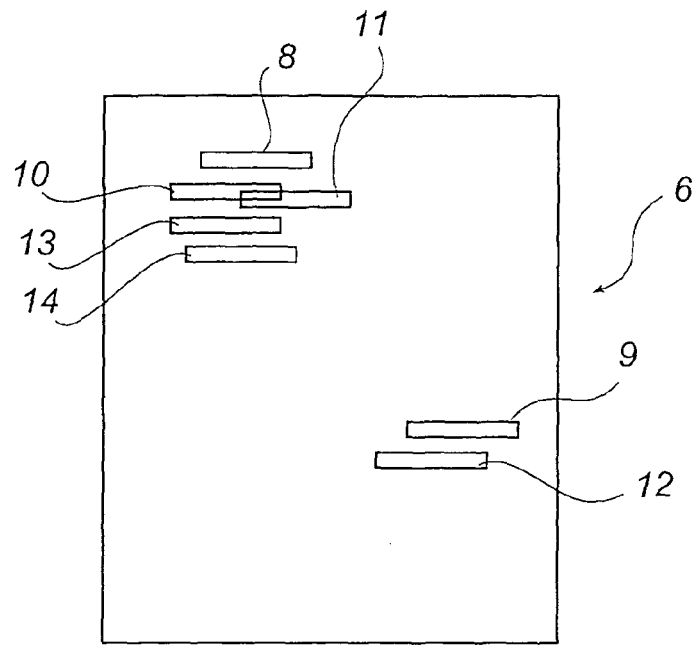
FIG. 3 shows schematically how recorded images of a fingerprint are compared with the reference image.

FIG. 3 shows schematically the reference image 6 from FIG. 2. The function of the device will now be described with reference to FIG. 3. When a finger is passed over the sensor 2, images of the finger will start to be recorded by the sensor 2. The first recorded image is converted to a comparison image 8, 9 which is compared with various parts of the reference image 6. The comparison between the images can be carried out in a plurality of known ways. The comparison image has at least a predetermined degree of conformity with the reference image 6 in a first comparison area and a second comparison area designated 8 and 9 respectively. The first comparison area 8 and the second comparison area 9 will thereafter be used as a first base area and a second base area respectively in the continued comparison. The second image that is recorded by the sensor 2 is used to generate a second comparison image which is compared with a plurality of comparison areas 10, 11 below the base area 8. For the sake of clarity, only a third comparison area 10 and a fourth comparison area 11 are shown in the Figure. In reality, the second comparison image is compared with a large number of comparison areas in various positions vertically and horizontally, and rotated through various angles in relation to the reference image. However, all the comparison areas are below the base area 8, as this corresponds to the expected direction of movement of the finger. The comparison results in the third comparison area being used as a new first base area. In the same way, a new second base area 12 is achieved. A third generated comparison image does not, however, conform sufficiently well with any one comparison area below the new second base area 12, for which reason the second base area 9 is rejected. Generated third and fourth comparison images conform, however, sufficiently well with a fifth comparison area 13 and a sixth comparison area 14. For each generation of a new base area, a comparison value is calculated indicating how well the comparison image conforms with the comparison area. When the total comparison value for comparisons in the same chain exceeds a predetermined value, the fingerprint that was recorded in succession by the sensor 2 is considered to conform with the reference fingerprint that is represented by the reference image 6. By comparing the comparison image with comparison areas that are displaced sideways, any sideways movements of the finger across the sensor can be taken into account.

Figure 4:
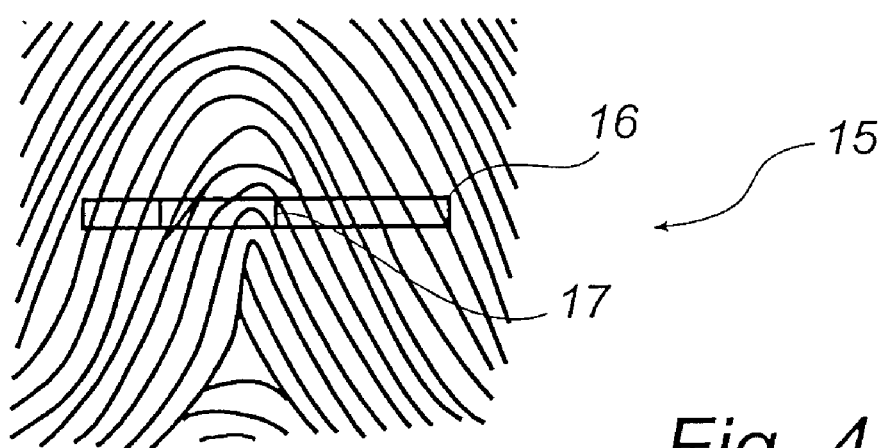
FIG. 4 shows how a comparison image is generated from a recorded image.

The generation of a comparison image from a reference image will now be described with reference to FIG. 4. FIG. 4 shows a fingerprint 15 within which a recorded image 16 is shown. The recorded image 16 contains 8×200 pixels. In order to make the comparison with a reference area sufficiently quick, a comparison image is generated 8×50 pixels in size, by selecting the part of the recorded image that has the most features. At the same time as selecting said part, the image is converted so that the grey scale is removed. The comparison time is thereby minimised, while retaining the security of the comparison.

The embodiments described above are only to be regarded as examples.

A person skilled in the art will recognise that the above embodiments can be varied in a number of ways without departing from the concept of the invention. For example, the recorded image can be used directly as the comparison image.

The invention claimed is:

1. A method for checking fingerprints, comprising the steps of:
   recording, in succession, digital images of finger areas of a finger when passed over a sensor, wherein:
      said sensor is substantially smaller than a fingertip of said finger in a passing direction of said finger,
      said sensor extends in a direction perpendicular to said passing direction of said finger, and
      said recorded digital images correspond to small portions of said fingertip; and
   comparing, as each of the digital images is recorded in said succession, each of said recorded digital images with one or more reference images,
   wherein said one or more reference images represent at least one previously recorded reference fingerprint from a reference finger area that is considerably larger than the finger areas of each of the recorded digital images for the purpose of checking whether the finger that corresponds to the recorded digital images conforms to the reference fingerprint,
   and wherein said step of comparing each of said recorded digital images with the one or more reference images includes:
      generating a comparison image based on a latest one of the recorded digital images and said one or more reference images, said comparison image representing at least a part of the latest recorded digital image,
      determining a correspondence between the generated comparison image and a plurality of comparison areas in the reference image in a vicinity of a latest one of a plurality base areas, said plurality of base areas forming a chain of base areas below a common base area in the reference image, and
      selecting one of said comparison areas as a new base area in said reference image based on the determined correspondence between the generated comparison image and the selected comparison area.

2. The method according to claim 1, wherein said latest one of said plurality of base areas is determined by said comparing, based on a preceding one of the plurality of successively recorded digital images.

3. The method according to claim 2, comprising:
   repeating said recording and said comparing until an end condition has been fulfilled.

4. The method according to claim 3, in which said end condition is that a predetermined number of a plurality of comparison images have been compared with the reference image.

5. The method according to claim 3, in which said end condition is that a combined conformity is achieved between a plurality of base areas and corresponding comparison images of said plurality of base areas.

6. A device for checking fingerprints, comprising:
a sensor that is arranged to record, in succession, digital images of finger areas from a first joint of a finger when the finger is passed over said sensor, wherein:
said sensor is substantially smaller than a fingertip of said finger in a passing direction of the finger,
said sensor extends in a direction perpendicular to said passing direction of said finger, and
said digital images corresponding to a small portion of a fingertip; and
a comparing means for comparing each of said recorded digital images, when each of said digital images is recorded in said succession by said sensor, with a reference image that represents at least one previously recorded reference fingerprint from a reference finger area which is considerably larger than each of the finger areas,
wherein said comparison means is arranged to:
generate a comparison image based on a latest one of said recorded digital images and said reference image, said comparison image representing at least part of the latest recorded digital image,
determine a correspondence between the generated comparison image and a plurality of comparison areas in the reference image in a vicinity of a latest one of a plurality base areas, said plurality of base areas forming a chain of base areas below a common base area in the reference image, and
select one of said comparison areas as a new base area in said reference image based on the determined correspondence between the generated comparison image and the selected comparison area.

7. The device according to claim 6, which is arranged to record the digital images until a predetermined number of said digital images have been recorded and compared.

8. The device according to claim 6, which is arranged to record said digital images of finger areas until a combined conformity is obtained between each of said base areas and corresponding comparison images of each of said base areas.

9. The device according to claim 6, wherein each of said comparison images is based on a part of a corresponding one of said recorded digital images that contains the most features.

10. The device according to claim 6, wherein said sensor has a length in the range of 5-25 mm, and a width in the range of 0.1-5 mm.

11. A method for checking a fingerprint of a finger, said method comprising the steps of:
providing a sensor, for sensing a fingerprint of a finger,
said sensor being substantially smaller than a fingertip of said finger in a passing direction of said finger, and
said sensor extending in a direction perpendicular to said passing direction of said finger;
recording a digital image of a finger area of said finger as said finger is passed over said sensor, said digital image corresponding to a small portion of said fingertip;
comparing said digital image with a reference image that represents at least one previously recorded reference fingerprint from a reference finger area, said reference image being substantially larger than said digital image; and
repeating said recording and said comparing of a plurality of successively recorded digital images of finger areas as said finger passes over said sensor, for the purpose of checking whether said fingerprint, which corresponds to said plurality of successive recorded digital images, conforms to said reference fingerprint,
wherein said comparing said recorded digital images with said reference image includes:
generating a comparison image, based on a latest one of the recorded digital images and said reference image, said comparison image representing at least a part of the latest recorded digital image,
determining a correspondence between the generated comparison image and a plurality of comparison areas in the reference image in a vicinity of a latest one of a plurality base areas, said plurality of base areas forming a chain of base areas below a common base area in the reference image, and
selecting one of the comparison areas as a new base area in said reference image based on the determined correspondence between the generated comparison image and the selected comparison area.

12. The method according to claim 11, in which a plurality of comparison images are generated from a part of a respective one of said recorded digital images that contains the most features.

13. The method according to claim 11, wherein said recording the digital image further comprises storing said digital image in a memory, said stored digital image being used in said comparing.

14. A method for checking fingerprints using a sensor, wherein
the sensor is substantially smaller than a fingertip in a passing direction of a finger,
the sensor extends in a direction perpendicular to said passing direction of said finger, and
the sensor successively records a series of digital images corresponding to a small area of said fingertip when the finger is passed over the sensor;
said method comprising:
successively recording a series of digital images a finger;
as the digital images are recorded in succession, comparing the latest one in the series of recorded digital images in said succession with a reference image; and
determining whether the fingerprint corresponds to the reference image based on the combined results of comparing the series of recorded digital images with the reference image,
wherein said comparing of the latest digital image in the series includes the following steps:
(A) generating a comparison image based on the latest recorded digital image in the series and said reference image, said comparison image representing at least a part of the latest recorded digital image;
(B) comparing the comparison image with a plurality of comparison areas in the vicinity of the latest of a plurality of base areas, said plurality of base areas forming a chain of base areas below a common base area in the reference image;
(C) determining, based on the comparing step, an amount of correspondence between the comparison image and the plurality of comparison areas; and
(D) selecting one of the comparison areas as a new base area for comparison with a subsequent comparison image based on the determined amount of correspondence between the comparison image and the selected comparison area, and wherein steps (A) to (D) are repeated for each of the successively recorded digital images as the digital images are recorded until an end condition is fulfilled.

15. The method according to claim 14, in which said end condition is that a predetermined number of a plurality of comparison images have been compared with the reference image.

16. The method according to claim 14, in which said end condition is that a combined conformity is achieved between a plurality of base areas and corresponding comparison images of said plurality of base areas.

17. The method according to claim 14, in which said comparison images are generated from a part of a respective one of said recorded digital images that contains the most features.

18. A device for checking fingerprints of a finger comprising:
   a sensor; and
   a comparing means;
   wherein:
      said sensor is substantially smaller than a fingertip of said finger in a passing direction of said finger,
      said sensor extends in a direction perpendicular to said passing direction of said finger,
      said sensor is arranged to record, in succession, a plurality of digital images of a finger area of said finger as said finger is passed over said sensor, said digital images corresponding to small portions of said fingertip,
   said comparing means is arranged to:
      generate a comparison image based on a latest one of said recorded digital images and said reference image representing at least part of the latest recorded digital image,
      determine a correspondence between the generated comparison image and a plurality of comparison areas in the reference image in a vicinity of a latest one of a plurality base areas, said plurality of base areas forming a chain of base areas below a common base area in the reference image,
      select one of said comparison areas as a new base area in said reference image based on the determined correspondence between the generated comparison image and the selected comparison area,
   said at least one reference image is substantially larger than said digital image of said finger area, and
   said device is arranged to repeat said recording and said comparing for the plurality of successively recorded digital images of finger areas as each of the digital images is recorded while said finger is passed over said sensor.

* * * * *